Aug. 31, 1943.   R. E. RISLEY   2,328,168
PIPE CLAMP
Original Filed June 17, 1941   5 Sheets-Sheet 1
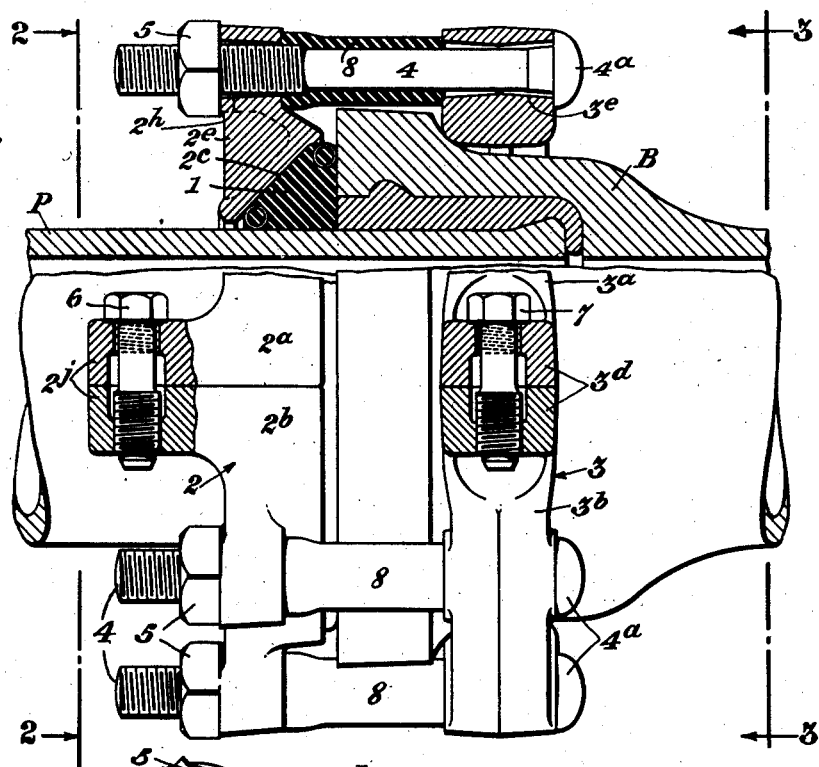

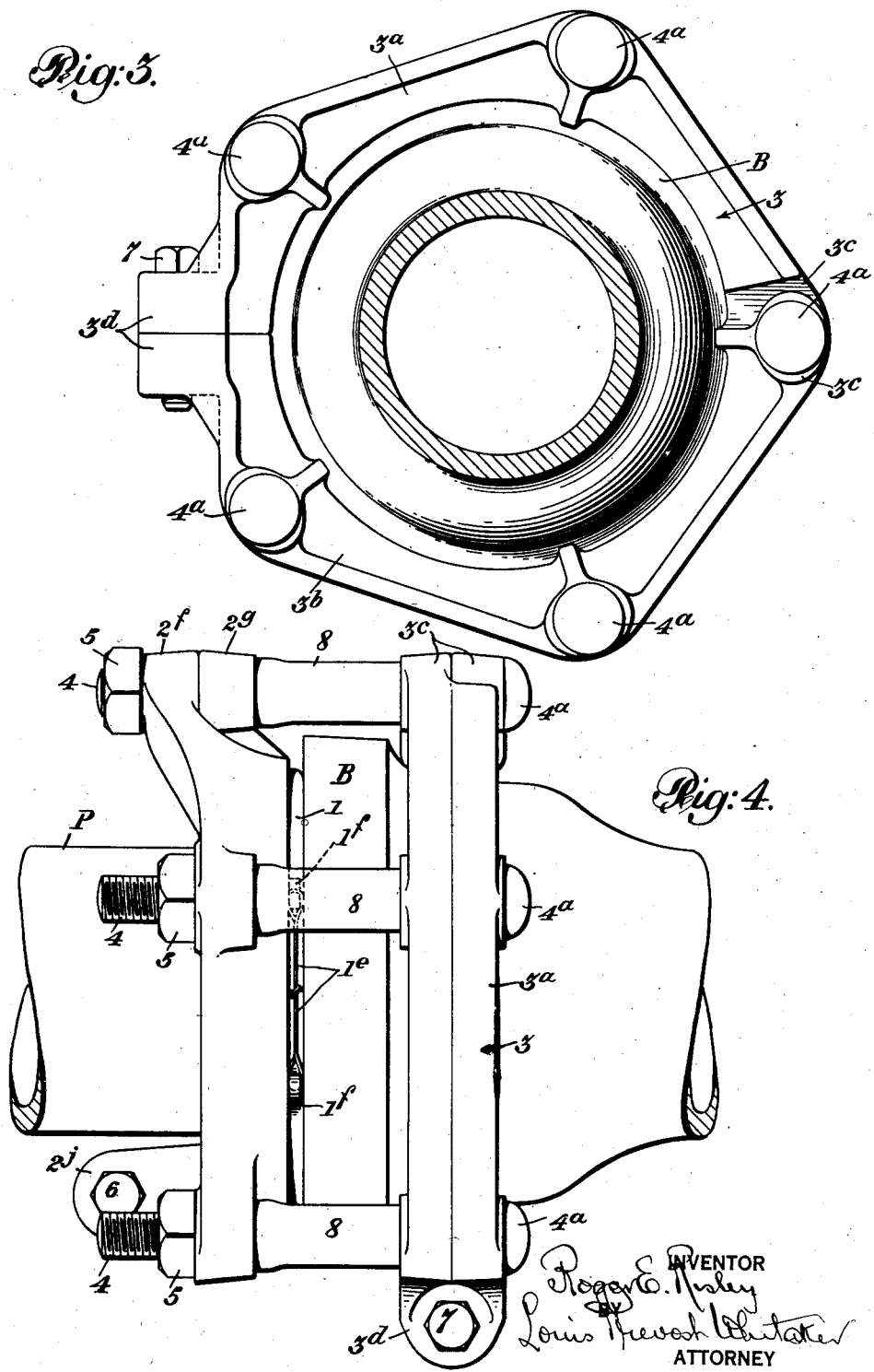

Aug. 31, 1943.　　　R. E. RISLEY　　　2,328,168
PIPE CLAMP
Original Filed June 17, 1941　　5 Sheets-Sheet 4
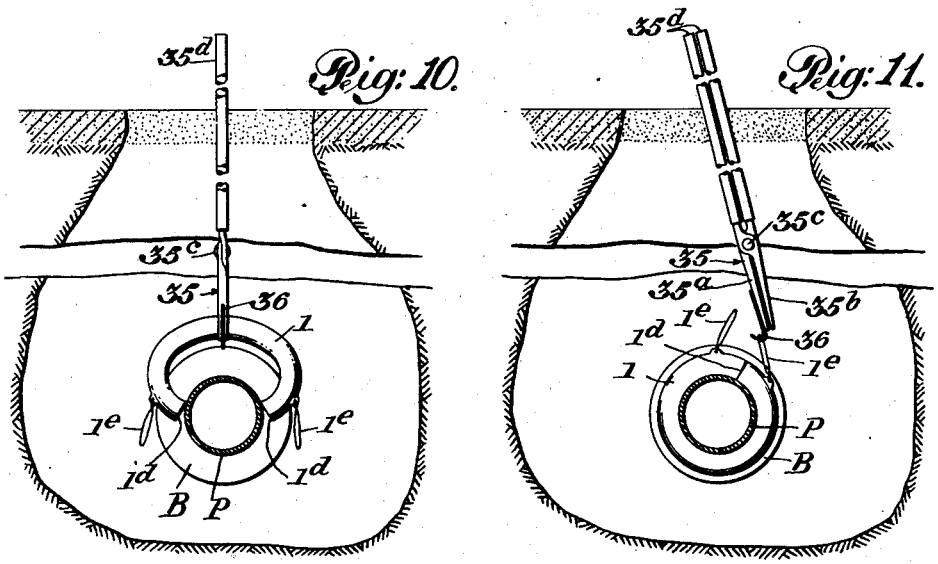
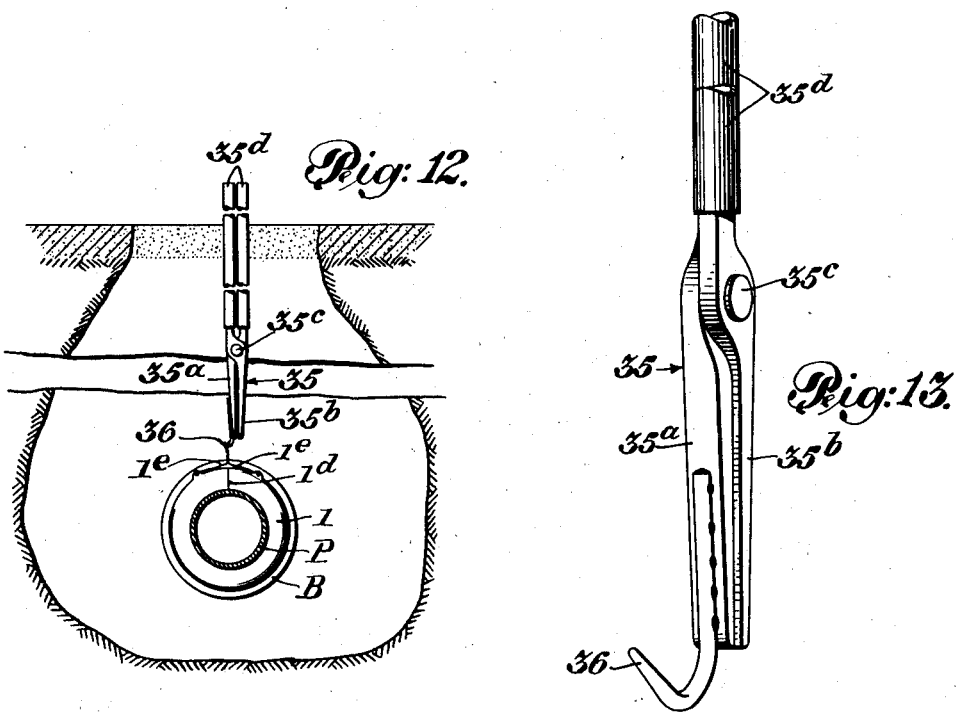
INVENTOR
Roger E. Risley
ATTORNEY Aug. 31, 1943.   R. E. RISLEY   2,328,168
PIPE CLAMP
Original Filed June 17, 1941   5 Sheets-Sheet 5

INVENTOR
Roos E. Risley
Louis Trevost Whitaker
ATTORNEY

Patented Aug. 31, 1943

2,328,168

UNITED STATES PATENT OFFICE 2,328,168

PIPE CLAMP

Roger E. Risley, Bradford, Pa., assignor to Dresser Manufacturing Company, Bradford, Pa., a corporation of Pennsylvania Original application June 17, 1941, Serial No. 398,380. Divided and this application October 27, 1942, Serial No. 463,482

2 Claims. (Cl. 288—11)

My invention consists in the novel features hereinafter described, reference being had to the accompanying drawings which illustrate several embodiments of the invention selected by me for purposes of illustration.

The present invention relates to the repair of underground pipe lines, for example, gas and water mains and to the application of a repair clamp to a pipe line by operations performed above ground through an excavating opening too small to admit a man. In order systematically to clamp the joints of an underground bell and spigot pipe line, it is necessary to dig a hole about every twelve feet along the line. Where the pipe line runs under a paved street, a considerable amount of repaving is required. Moreover, many cities require that the repaving of any hole larger than a specified size, for example one foot square, be done by the city or a city designated contractor, and the cost is often rather high. To avoid this high paving cost and to keep the expense of the excavations at a minimum, it is highly advantageous to install a repair clamp by making only a small hole, for example, one foot square, and apply the clamp to the pipe by operations performed by men above ground, working with special tools through the foot square opening.

The key to success in obtaining a satisfactory repair has been found to be the proper application of the gasket. It has been proposed to attach the gasket to a repair clamp and apply both to the pipe joint simultaneously. However, with this procedure, it is impossible to inspect the gasket after it has been placed on the pipe and before the clamp is applied to insure that the gasket is properly positioned to seal the joint effectively. It is hence difficult to position the gasket properly and be assured of a tight and lasting pipe joint. It is an object of the present invention to overcome this difficulty.

In accordance with the present invention, the gasket is placed on the pipe before the clamp is applied, and the gasket can thus be carefully positioned to seal the joint effectively. The gasket is then secured in position so that it will not be displaced by the application of the pipe clamp. After the gasket is properly positioned and secured in place, the pipe clamp is lowered into the excavation, positioned over the pipe and tightened to apply sealing pressure to the gasket. In this manner the gasket can be inspected before the clamp is applied and a tight repair joint is assured. The invention relates to the novel structure of the clamp and gasket; the method of applying the gasket and clamp to a pipe line being disclosed and claimed in application Serial No. 398,380, filed June 17, 1941, of which the present application is a division.

The nature and advantages of the invention will be more fully understood from the following description in conjunction with the accompanying drawings which illustrate by way of example a pipe clamp and the installation of the clamp to a pipe.

In the drawings,

Fig. 1 is a side elevation, partially in section, of a bell and spigot pipe joint with a repair clamp in accordance with the invention applied thereto.

Fig. 2 is a vertical sectional view taken on the line 2—2 in Fig. 1.

Fig. 3 is a sectional view taken on the line 3—3 in Fig. 1.

Fig. 4 is a top plan view of the pipe joint and clamp shown in Fig. 1.

Figs. 10, 11 and 12 are vertical sectional views taken transversely of the pipe line and illustrating successive operations in applying the gasket and securing it in position.

Fig. 13 is an enlarged fragmentary view of the tool shown in Figs. 10 to 12.

Figure 5:
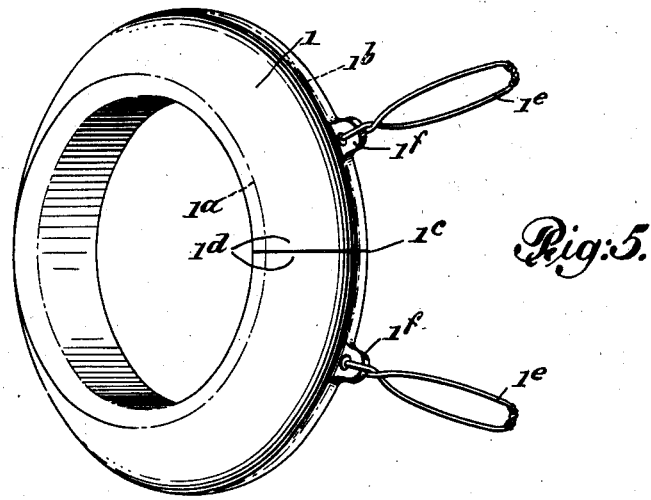
Fig. 5 is a perspective view of the gasket of the pipe clamp shown in Fig. 1.
Figure 6:
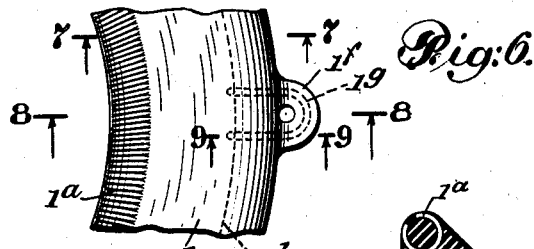
Fig. 6 is a fragmentary end elevational view of the gasket showing the construction of one of the eyelets for fastening the ends of the gasket together.
Figure 7:
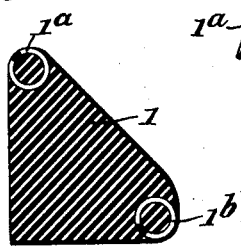
Fig. 7 is a sectional view taken on the line 7—7 in Fig. 6.
Figure 8:
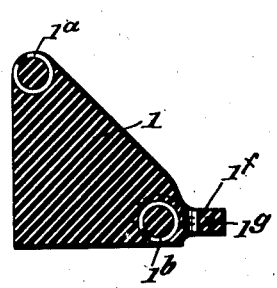
Fig. 8 is a sectional view taken on the line 8—8 in Fig. 6.

In Figs. 1 to 4 there is illustrated by way of example a repair clamp embodying the present invention. The clamp comprises a gasket 1, a follower ring 2, an anchor ring 3, and a plurality of through bolts 4, with nuts 5 connecting the follower and anchor ring. The follower ring 2 is composed of a plurality of arcuate sections integrally connected together, the clamp illustrated in the drawings having two such sections 2a and 2b. Each section is shown as having a gasket engaging face 2c and a peripheral portion 2d forming together a V-shaped cross section with a plurality of radial webs 2e connecting the two portions to provide a light, strong construction. At one end of each section, there is provided an apertured hinge portion 2f, 2g, the hinge apertures of the two sections being axially aligned. The hinge portion 2f of section 2a is off-set from the central plane of the ring in a direction away from the gaskets engaging face 2c, and the hinge portion 2g of the section 2b is off-set a greater distance to enable it to come outside of the hinge portion 2f, bringing the two hinge apertures into alignment. One of the through bolts 4 extends through the hinge apertures forming a hinge pin for the two sections of the follower ring. Additional through bolts extend through other apertures 2h provided in the follower ring sections. The free ends of the two sections 2a and 2b are provided with apertured lugs 2j projecting axially from the follower ring in a direction away from the gasket engaging space 2c. The apertures of lugs 2j are preferably threaded to receive a threaded stud bolt 6 connecting the free ends of the two sections together to close the follower ring. Outwardly of the gasket-engaging surface, the force exerted by the through bolts in applying pressure to the gasket is out of line with the opposing force exerted by resistance of the gasket and this results in a couple exerting a twisting moment on the sections of the follower ring. Referring, for example, to the upper half of Fig. 1, it will be seen that the force exerted by the through bolts is toward the right, while the resistance of the gasket is toward the left, thus constituting a couple tending to twist the upper section of the follower ring in a clockwise direction. The offsetting of the lugs 2j in an axial direction gives the connecting bolts 6 greater leverage in resisting this twisting moment, and thus puts less strain on the bolts. Moreover, the axially offset lugs make it possible to position the bolt 6 closely adjacent the wall of the pipe in approximately the same plane as the forces acting on the follower ring, so that the bolt is in tension rather than being subjected to bending or torsion. Resistance to the twisting moment on the ring section is supplemented by the offsetting of the hinge portions 2f and 2g as described above.

The anchor ring 3 is adapted to fit over the bell of the pipe and is likewise made up of a plurality of hinged sections, being illustrated as having two sections 3a and 3b. In the embodiment shown in the drawings, the two sections of the anchor ring are identical and can hence be made with the same pattern or dies. Each section has an apertured hinge portion 3c, the apertures being axially aligned to receive a through bolt 4 which forms a hinge pin connecting the two sections. The free ends of the sections are provided with lugs 3d having apertures which are preferably threaded to receive a bolt 7 connecting the ends of the two sections together. The lugs 3d may be offset axially as described above for the anchor ring, but this is generally unnecessary as the distance between the opposing forces and hence the twisting moment on the anchor ring is less. It is hence preferable for the lugs to be radially disposed in order to restrict the axial dimensions of the anchor ring so that it may readily be used on T's, L's, or other fittings. In addition to the hinge apertures, the anchor ring is provided with apertures for the other through bolts, all of the apertures being preferably noncircular to receive track head through bolts and prevent them from turning. The relatively heavy through bolts 4 extending through the hinge apertures provide a strong hinge construction which permanently connects the ring section into a single assembly, and enables both ring sections to be secured about the pipe by only two connecting bolts 6 and 7. The hinged sections of the two rings are held in alignment by an impervious endwise compressible sleeve 8, which is formed, for example, of rubber or similar resilient deformable material, and extends from the anchor ring to the follower ring. Referring particularly to Fig. 4 it will be seen that in conjunction with the heads 4a and nut 5 of the through bolt, the rubber sleeve 8 holds the section of each ring in alignment and prevents axial separation of the coacting hinge portions. The sleeve also holds the track head 4a of the bolt in engagement with the noncircular aperture of the anchor ring to hold the bolt against rotation. The length of the sleeve 8 is such that when the through bolts are tightened, the sleeve is compressed so that the ends of the sleeve are pressed tightly against the anchor ring and follower ring respectively, thereby sealing the ends of the sleeve and completely enclosing the portion of the bolt extending between the two rings. This critical portion of the through bolt is thus effectively protected against corrosion by the soil. The other through bolts are preferably likewise enclosed by rubber sleeves 8 which protect the bolts against corrosion, hold the track heads of the bolt in engagement with the noncircular openings of the anchor ring and maintain the anchor ring and follower ring in properly spaced relationship. By referring particularly to Fig. 1, it will be seen that in placing the clamps around the pipe joints the rubber sleeves 8 engage the periphery of the bell of the pipe and thereby assist in centering the clamp on the pipe joint.

Figure 9:
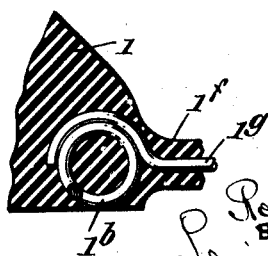
Fig. 9 is an enlarged fragmentary sectional view taken on the line 9—9 in Fig. 6.

The gasket 1 shown in more detail in Figs. 5 to 9 is preferably formed of rubber or similar resilient deformable material. In the form shown, the gasket is of approximately triangular cross section and preferably has its outer corners protected by coiled wire reinforcing elements 1a and 1b to restrain undesirable cold flow of the rubber. The rubber ring is split, as indicated at 1c, so that the two ends 1d of the open ring may be separated in order to place the gasket over a pipe. Means is provided for securing the two ends of the split ring together to hold the gasket in a position on the pipe on which it has been placed. In the embodiment illustrated, the means for connecting the end of the ring comprise loops of wire 9 passing through eyelets 1f provided adjacent the ends of the ring. Each eyelet 1f may be reinforced by a wire staple 1g which is preferably anchored to the reinforcing element 1b as illustrated in Fig. 9. The wire loops and eyelets are preferably spaced back away from the end faces of the ring in order to leave the ends of the ring free so that the gaskets may be forced over the pipes in the manner illustrated in Fig. 10, without damaging or interfering with the loops and eyelets. The ends of the gasket ring may be drawn together and united by twisting the two loops of wire together as illustrated in Fig. 12. It will be seen that the connecting means for the ends of the gasket in no way interfere with the engagement of the gasket with the follower ring and with the adjacent pipe surfaces.

In applying the gasket and clamp to repair a pipe line, an excavation is made down to the pipe and the pipe joint is cleaned, as described in parent application, Serial No. 398,380. After the pipe joint has been thoroughly cleaned, the gasket 1 is placed around the pipe and secured in proper position to seal the joint. Successive operations in applying the gasket are illustrated in Figs. 10 to 12. Apparatus for performing these operations is shown in more detail in Fig. 12. This apparatus comprises tongs 35 having opposed jaws 35a and 35b pivotally connected at 35c and elongated operating handles 35d for opening and closing the jaws. One of the jaws 35a is provided adjacent its end with an outwardly and backwardly projecting hook 36 which may be permanently secured to the jaw, for example, by welding. As illustrated in Fig. 10, the gasket may be placed on the pipe by gripping the gasket with tongs 35 at a point opposite the ends 1d of the split ring and pressing the ends down over the pipe. As the wire loops e are spaced back a short distance from the ends of the gasket ring, this operation does not interfere with or damage the loops. One of the wire loops 1e is then grappled with the hook 36, and the gasket is rotated about the pipe (Fig. 11) to a position in which the split of the gasket ring is approximately at the top of the pipe. The other wire loop 1e is then grappled so that both loops are in the hook 36, and the hook is thereupon rotated to twist the wire loops together. This operation draws the ends of the gasket toward one another and secures them in abutting relationship. The gasket is now held securely on the pipe and may be inspected to assure that it is in proper position before the clamp is applied.

Figure 14:
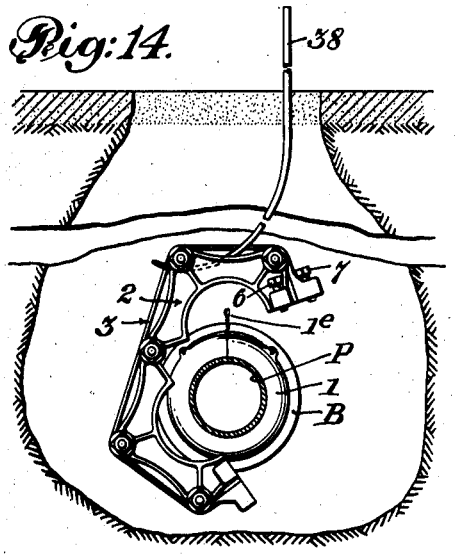
Figs. 14, 15, 16 and 17 are schematic vertical sectional views taken transversely of the pipe line and illustrating successive operations in applying the clamp to the pipe joint together with apparatus for carrying out the respective operations.
Figure 15:
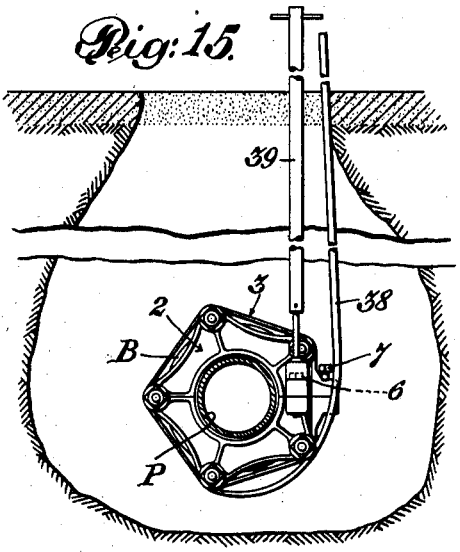
Figure 17:
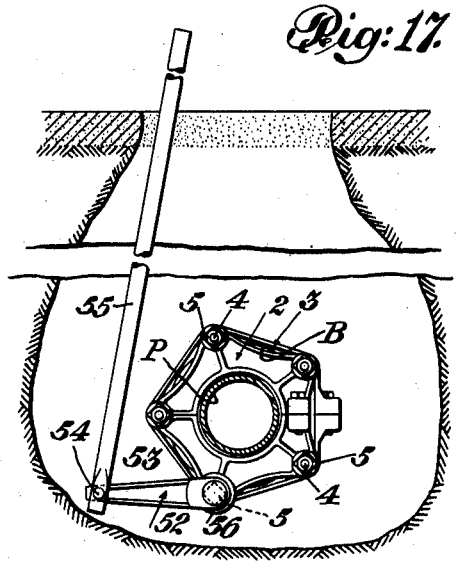

After the gasket has been carefully positioned and secured in place on the pipe, the repair clamp is installed by the operations illustrated in Figs. 14 and 17. It will be understood that before being placed on the pipe, all parts of the pipe clamp are assembled together, the assembling having preferably been done at the factory. The anchor ring and the follower ring are connected together by the through bolts 4 and the arcuate sections of each ring are hingedly connected by one of the through bolts. The connecting stud bolts 6 and 7 for the follower ring and anchor ring are screwed into the threaded apertures of the lugs 2h and 3d of the upper sections of the respective rings. The ring in this pre-assembled condition is lowered into the excavation by means of a suitable hook 38 which is hooked under one of the through bolts of the upper ring sections so that the ring hangs open as shown in Fig. 14. The upper ring sections are placed over the top of the pipe with the anchor ring behind the scarf of the bell, and the follower ring on the opposite side of the gasket. The clamp is then closed by grappling one of the through bolts of the lower ring sections with the hooks 38 and raising the lower sections of the rings as shown in Fig. 15. The excavation may be belled out laterally as shown to afford adequate room for installing the clamp. While holding the lower ring section up by means of the hook 38, the connecting bolts 6 and 7 are screwed into the apertured lugs of the lower ring sections and tightened by means of a long handled socket wrench illustrated in Fig. 15.

Figure 16:
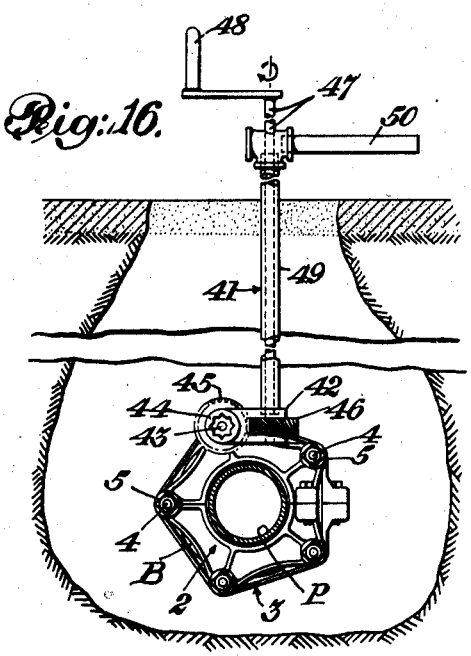

With the free ends of the hinged ring sections thus connected together to secure the clamp about the pipe, the nuts 5 on through bolts 4 are next drawn up to apply sealing pressure to the gasket. Initial tightening of the nuts is speedily effected by the geared wrench illustrated in Fig. 16. This wrench designated in general by the reference numeral 41 comprises a frame or housing 42 which is shown in the form of a double yoke. A spindle 43 is rotatably mounted in the housing and carried at one or each end of a wrench head or socket 44. The spindle 44 is rotatable by means of a gear 45, which meshes with a gear 46 carried by an operating shaft 47, rotatably mounted in the housing with its axis at right angles to the axis of the spindle.

The operating shaft 47 extends upwardly and has at its upper end an operating handle 48 whereby the shaft may be rotated in either direction. The gears connecting the operating shaft 47 with the spindle 43 may be selected to drive the spindle at the desired speed. To prevent rotation of the housing 42 by the torque applied to the operating shaft 47, a reaction shaft 49 is secured at one end to the housing and extends parallel with and adjacent to the operating shaft. In the embodiment shown in Fig. 26 the reaction shaft and operating shaft are arranged coaxially with one another. The reaction shaft 49 may be provided with a suitable handle 50. The wrench is operated by placing the wrench head over the nut of the through bolt of the clamp and rotating the spindle 43 and wrench head 41 by rotation of the operating shaft 47, while maintaining the wrench in place and preventing rotation of the housing by holding the reaction shaft 49 stationary. With this apparatus the nuts of the through bolts can be rapidly drawn up.

Final tightening of the nuts on the through bolts of the clamp is effected by the ratchet wrench 52 illustrated in Fig. 17. This wrench comprises an arm 53 pivotally connected at 54 to an elongated handle 55, and carrying at the outer end of the arm a ratchet socket 56. A spring connection between the arm 53 and handle 55 holds the arm in laterally projecting position to facilitate placing the socket 56 over the nut while permitting relative pivotal movement between the arm and the handle during operation of the wrench. The wrench is operated by lengthwise reciprocation of the handle 55, whereby the arm 53 is oscillated about the through bolts of the clamp. By reason of the ratchet socket, oscillation of the arm in one direction tightens the nuts, while oscillation in the opposite direction constitutes an idling stroke. The leverage provided by the arm 53 makes it possible to draw the nuts up tightly to apply effective sealing pressure to the gasket of the clamp.

It will be understood that through the cooperation of a split gasket having means for securing it in position on the pipe, and a hinged clamp of the kind described, all the operations in installing the gasket and the clamp can be performed by men working above the surface of the ground, it being unnecessary for anyone to descend into the excavation. The repair clamp can hence be installed by operations performed wholly through an opening too small to admit a man, thereby effecting a substantial saving in excavating and repaving costs.

What I claim and desire to secure by Letters Patent is:

1. A gasket for a pipe clamp comprising a split ring of elastic deformable material providing a sealing surface for fluid tight engagement with a pipe, a circumferentially extending reinforcing element at least partially embedded in said material and disposed radially outwardly of said sealing surface, eyelets provided adjacent the split ends of the ring for securing the said ends together, said eyelets being located radially outwardly of said sealing surface and being anchored to said reinforcing element of the gasket.

2. A gasket for a pipe clamp comprising an open ring of elastic deformable material providing a sealing surface for fluid tight engagement with a pipe, a reinforcing element at least partially embedded in said material and connecting means for drawing the ends of the ring tightly together and securing them in abutting relationship, said connecting means being connected with the ring at points located radially outwardly of said sealing surface and spaced back from the end faces of the ring and being anchored to said reinforcing element.

ROGER E. RISLEY.